(No Model.) 3 Sheets—Sheet 1.
W. M. WATKINS.
COMBINED DRILL, PLANTER, AND GUANO DISTRIBUTER.
No. 247,448. Patented Sept. 20, 1881.

Witnesses: Inventor.

(No Model.) 3 Sheets—Sheet 2.

W. M. WATKINS.
COMBINED DRILL, PLANTER, AND GUANO DISTRIBUTER.

No. 247,448. Patented Sept. 20, 1881.

Witnesses:
Jas. E. Hutchinson
Henry C. Hazard

Inventor
W. M. Watkins, by
Geo. S. Prindle, his Atty (No Model.) 3 Sheets—Sheet 3.

W. M. WATKINS.
COMBINED DRILL, PLANTER, AND GUANO DISTRIBUTER.

No. 247,448. Patented Sept. 20, 1881.

Witnesses:
Jas. E. Hutchinson.
Henry C. Hazard.

Inventor:
W. M. Watkins, by
Geo. L. Prindle, his Atty.

UNITED STATES PATENT OFFICE.

WILLIAM M. WATKINS, OF SOCIAL CIRCLE, GEORGIA.

COMBINED DRILL, PLANTER, AND GUANO-DISTRIBUTER.

SPECIFICATION forming part of Letters Patent No. 247,448, dated September 20, 1881.

Application filed September 30, 1880. (No model.)

*To all whom it may concern:*

Be it known that I, WILLIAM M. WATKINS, of Social Circle, in the county of Walton and State of Georgia, have invented certain new and useful Improvements in Seed-Drilling, Hill-Planting, and Guano-Distributing Machines; and I do hereby declare that the following is a full, clear, and exact description thereof, reference being had to the accompanying drawings, making a part of this specification, in which—

Figure 1:
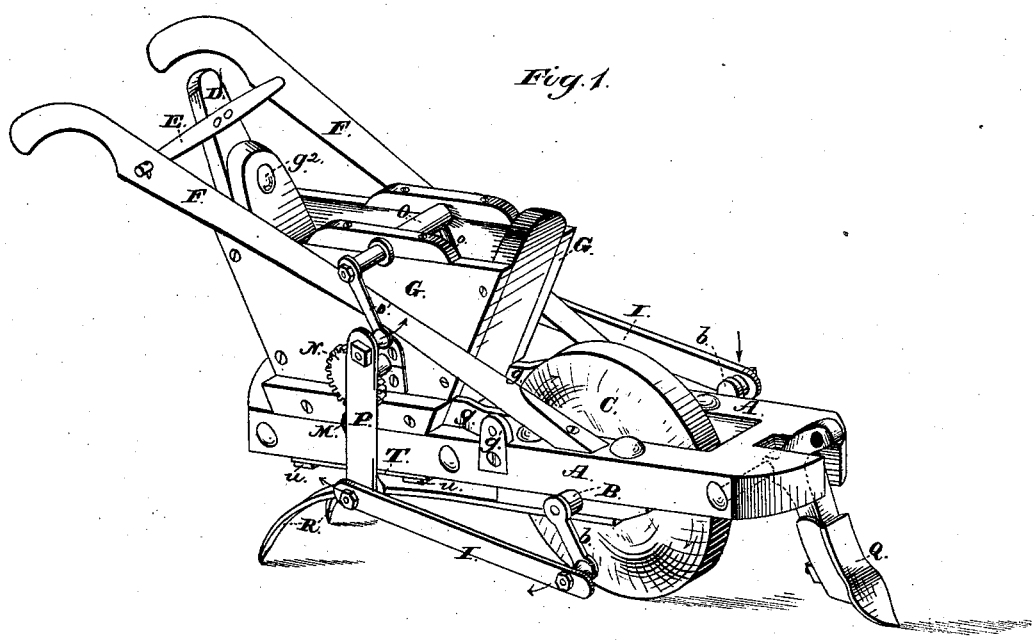
Figure 2:
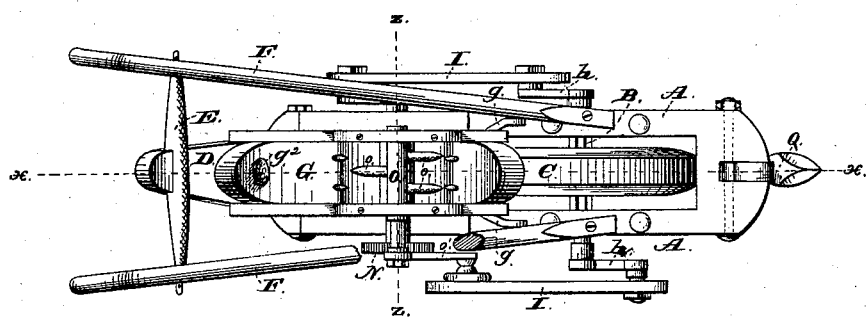
Figure 3:
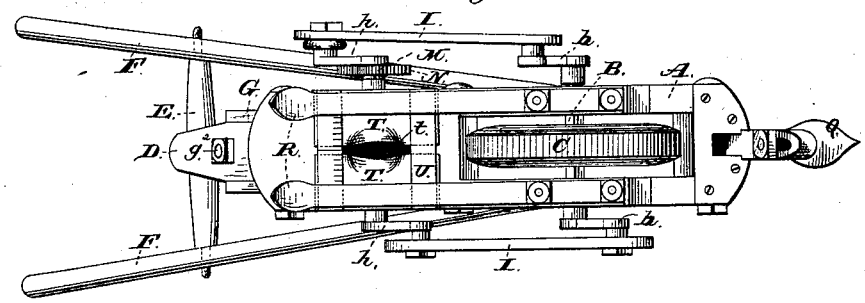
Figure 4:
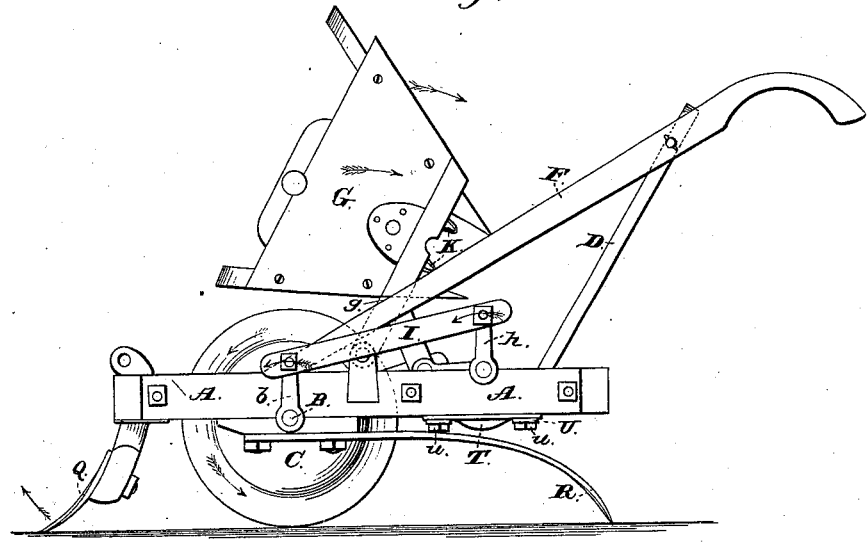
Figure 5:
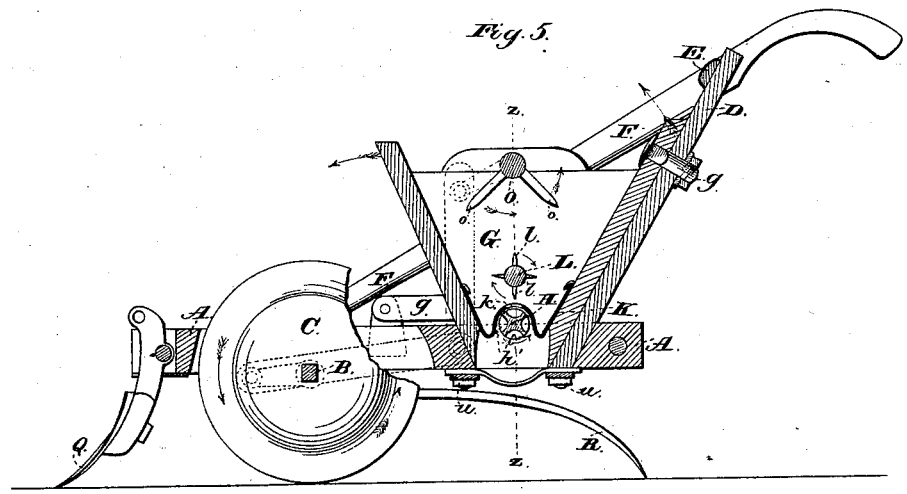
Figures 6, 7, 8:
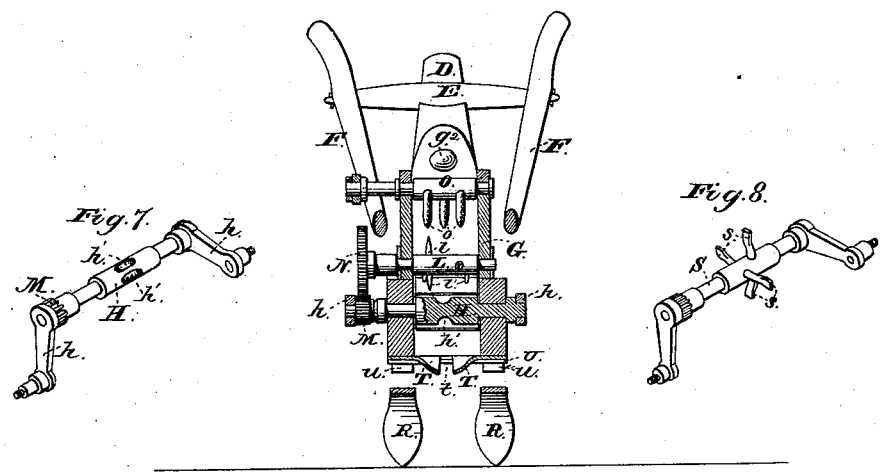

Figure 1 is a perspective view of my machine as arranged for use. Fig. 2 is a plan view of the upper side of the same. Fig. 3 is a like view of the lower side of said machine. Fig. 4 is an elevation of one side of the same, the hopper being turned forward so as to uncover the seed-dropping device. Fig. 5 is a longitudinal section on line $x\ x$ of Fig. 2. Fig. 6 is a cross-section on line $z\ z$ of Figs. 2 and 5; and Figs. 7 and 8 are, respectively, perspective views of the shafts employed for dropping corn and other like seed, and for distributing fertilizers.

Letters of like name and kind refer to like parts in each of the figures.

The design of my invention is to furnish a simple, convenient, and efficient means whereby corn, cotton, and other seeds may be planted and fertilizers distributed; and to this end it consists, principally, in the means employed for opening a furrow and for closing the same after the seed or fertilizer has been deposited therein, substantially as and for the purpose hereinafter specified.

It consists, principally, in the means employed for agitating and dropping the seed or fertilizer, substantially as and for the purpose hereinafter shown.

It consists, further, in the means employed for operating the devices for agitating and dropping the seed or fertilizer, substantially as and for the purpose hereinafter set forth.

It consists, finally, in the general construction and combination of parts, as and for the purpose hereinafter specified.

In the annexed drawings, A and A represent two side rails, which are arranged in parallel lines, and are connected together at their ends by means of suitable cross-bars, or have said ends extended inward until they meet, as desired, so as to form a frame having its central portion open.

At a point about one-third the distance from the front to the rear end of the frame is journaled a shaft, B, upon which, between the rails A, is secured a wheel, C, that furnishes a rolling support for the machine, and, through cranks $b$, attached to the projecting ends of said shaft, gives motion to the operative parts of said machine, as hereinafter shown.

From a point near the rear end of the frame a bar, D, extends upward and rearward, and to the upper end of the same is attached a cross-bar, E, that at its ends passes through and is pinned to two handles, F, which handles have substantially the shape of plow-handles, and, extending downward and forward, have their front ends secured to or upon the side bars, A, nearly over the shaft B.

Directly in front of the bar D is placed a hopper, G, which has parallel vertical side walls and downward and inward sloping front and rear walls, and is hinged to or upon the frame by means of two bars, $g$, that extend forward from the lower end at each side of said hopper, and are pivoted upon two lugs, $g'$, which extend upward from the side rails, A, the arrangement being such as to enable said hopper to be turned forward to the position shown in Fig. 4, or to occupy the position shown in Figs. 1 and 5. The hopper G is secured in its normal position by means of a bolt, $g^2$, which passes through the bar D and through the upper end of the rear end of the rear wall of said hopper, as seen in Fig. 5.

Journaled transversely within suitable bearings upon the side rails, A, within the lower end of the hopper G, is a shaft, H, which at each end is provided with a crank, $h$, that is connected by means of a rod, I, with the corresponding crank $b$ of the shaft B. Said cranks $b$ and $h$ are set quartering with relation to the cranks $b$ and $h$ upon the opposite ends of their shafts, by which means a continuous rotation of said shaft H is secured when the machine is moved so as to rotate said shaft B.

Around the central portion of the periphery of the shaft H, at equidistant points, are provided recesses or cups $h'$, which have such dimensions as to enable each to contain one or more grains of corn or other grain; and over said shaft, within the lower end of the hopper G, is placed a metal casing, K, that has at its upper central portion an opening, k, which coincides with said cups h' and permits grain contained within said hopper to pass downward into said cups. If, now, grain is supplied to the hopper G and the machine moved forward, each of the cups h' as it passes beneath the opening k will be filled with grain, and will drop the same upon the ground as the shaft H rotates and turns said cup downward.

In order that the contents of the hopper G may be stirred up and prevented from clogging, a shaft, L, is journaled within the hopper G directly above the cup-shaft H, and is connected with and rotated by the latter by means of a pinion, M, that is attached to the projecting end of said shaft H, and a gear-wheel, N, which is attached to or upon said shaft L and meshes with said pinion. One or more series of radial spurs, l, project from said shaft L within said hopper, and have such length as to cause their ends to nearly touch the casing or covering-plate K as said shaft L rotates, the result being a thorough agitation of the grain at such point. The contents of the hopper G is still further agitated by means of a rock-shaft, O, that is journaled within the upper portion of the same, is provided with one or more downward-projecting spurs, o, and is oscillated by means of a rod, P, which is pivoted at one end upon one of the cranks h of the cup-shaft H, and at its opposite end upon a crank, o', that is secured upon the corresponding projecting end of said shaft O.

Pivoted at the front end of the machine, directly in line with the wheel C, is a plow-foot, Q, which has such size and shape as to cause it to open a furrow of the desired width and depth, while at the rear end of the machine are two covering-plows, R, each of which has its front end connected to or with the lower face of one of the rails A, and is capable of lateral adjustment of its rear end toward or from the central line or line of draft. As thus constructed, it will be seen that the plow-foot Q opens a furrow, the roller C completes the same, seed is deposited in said furrow by means of the dropping mechanism, and soil is finally covered over said seed by the plows R, the said operations being automatically performed while the machine is drawn forward.

In order to adapt the machine to use in the distribution of fertilizers, the casing K and cup-shaft H are removed, and in place of the latter is inserted a shaft, S, (shown in Fig. 8,) which is the counterpart of the same, except that in place of the cups h' of said shaft H radial spurs s are provided upon said shaft S. The lower end of the hopper G is now inclosed by means of two plates, T, which are placed upon each side of the central longitudinal line of the machine, and are held in place by two transverse bars, U, one of which extends across said plates at each end, and is held upward against the same by means of bolts u, that pass upward through its ends. The plates T are adjustable toward or from each other, so as to form an opening, t, which has any desired width, and between the bars U the contiguous edges of said plates are bent downward in a curve, as shown in Figs. 3 and 6, so as to cause the contents of the hopper G to incline inward and downward toward said opening. If, now, a fertilizer is placed within the hopper G and the machine drawn forward, said fertilizer will be fed downward to the discharge-opening t, and will escape through the latter, the amount discharged being regulated by the size of said opening.

Having thus fully set forth the nature and merits of my invention, what I claim as new is—

1. In combination with the furrow forming and covering mechanism described, the cup-shaft H h', journaled within the lower end of the hopper G, the shaft L, provided with the spurs l and arranged to rotate within said hopper above said cup-shaft, and the rock-shaft O, having the spurs o and journaled within the upper portion of said hopper and caused to oscillate therein, said parts being combined with connecting operating mechanism in the manner and for the purpose hereinbefore shown.

2. The combination, with the furrow forming and covering mechanism described, of the cup-shaft H h', shaft L, rock-shaft O, constructed and arranged as described, and the wheel C, shaft B, cranks b and h, rod I, pinion M, gear-wheel N, rod P, and crank o', for operating said shafts, substantially as and for the purpose described.

3. The hereinbefore-described seed-planting and guano-distributing machine having the following operative parts, viz: the hinged hopper G, provided with the covering-plate K and adjustable bottom plates, T, the cup-shaft H, having the cranks h and recesses h', the rotating shaft L, provided with the spurs l, the oscillating shaft O, having the arms o, the shaft B, carrying the wheel or roller C, and provided with the cranks b, the rods I and P, the pinion M, and the gear-wheel N, in combination with the pivoted plow-foot Q and covering-plows R, substantially as and for the purpose specified.

WILLIAM M. WATKINS.

Witnesses:
 M. W. BURTON,
 E. PATRICK.